(12) United States Patent
Larsen et al.

(10) Patent No.: US 9,818,085 B2
(45) Date of Patent: Nov. 14, 2017

(54) LATE CONSTRAINT MANAGEMENT

(71) Applicant: INTERNATIONAL BUSINESS MACHINES CORPORATION, Armonk, NY (US)

(72) Inventors: Rune H. Larsen, Allerod (DK); David P. Moore, Burleigh Waters (AU); Franz Wolfhagen, Stenlose (DK)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 14/150,015

(22) Filed: Jan. 8, 2014

(65) Prior Publication Data

US 2015/0193273 A1    Jul. 9, 2015

(51) Int. Cl.
*G06Q 10/10* (2012.01)
*G06F 21/00* (2013.01)

(52) U.S. Cl.
CPC ........... *G06Q 10/103* (2013.01); *G06F 21/00* (2013.01); *G06F 2221/21* (2013.01)

(58) Field of Classification Search
None
See application file for complete search history.

(56) References Cited

U.S. PATENT DOCUMENTS

| | | | |
|---|---|---|---|
| 8,132,231 B2 | 3/2012 | Amies et al. | |
| 8,176,490 B1 | 5/2012 | Jackson | |
| 2003/0105978 A1* | 6/2003 | Byrne | G06F 17/30067 726/4 |
| 2008/0098453 A1* | 4/2008 | Hinton et al. | 726/1 |
| 2009/0150981 A1* | 6/2009 | Amies et al. | 726/5 |
| 2009/0265551 A1* | 10/2009 | Tripunitara et al. | 713/168 |
| 2010/0162389 A1* | 6/2010 | Burger et al. | 726/21 |
| 2013/0166677 A1 | 6/2013 | Chung et al. | |
| 2014/0123257 A1* | 5/2014 | Gordon et al. | 726/7 |

FOREIGN PATENT DOCUMENTS

| | | |
|---|---|---|
| WO | 2009008567 | 1/2009 |
| WO | 2010127380 | 11/2010 |

OTHER PUBLICATIONS

Ben-Ghorbel-Talbi, et al.; Managing Delegation in Access Control Models; 15th International conference on Advanced Computing and Communications; Dec. 18-21, 2007; pp. 744-750.

* cited by examiner

*Primary Examiner* — Lewis A Bullock, Jr.
*Assistant Examiner* — Bruce S Ashley
(74) *Attorney, Agent, or Firm* — Schmeiser, Olsen & Watts; John Pivnichny (57) ABSTRACT

A method and system for integrating restrictions in an identity management system is provided. The method includes generating a role/account attribute table storage from static and dynamic rule defined values. A role request for a first role associated with a user is received and a set of attributes comprising a result of the role request are calculated. The set of attributes are transmitted to a target system for evaluation and a result is received.

20 Claims, 5 Drawing Sheets

LATE CONSTRAINT MANAGEMENT

FIELD

The present invention relates generally to a method for managing conflicting constraints, and in particular to a method and associated system for managing late constraints in an identity management system.

BACKGROUND

Determining system limitations typically includes an inaccurate process with little flexibility. Resolving system limitations may include a complicated process that may be time consuming and require a large amount of resources. Accordingly, there exists a need in the art to overcome at least some of the deficiencies and limitations described herein above.

SUMMARY

A first aspect of the invention provides a method comprising: dynamically generating, by a computer processor of an identity management system, a role/account attribute table storage from static and dynamic rule defined values; receiving, by the computer processor from a user, a role request for a first role associated with the user; calculating, by the computer processor, a set of attributes comprising a result of the role request; storing, by the computer processor within the role/account attribute table storage, the set of attributes; transmitting, by the computer processor to a target system, the set of attributes, wherein the target system evaluates the set of attributes for constraints; and receiving, by the computer processor, a result of the target system evaluating the set of attributes for constraints.

A second aspect of the invention provides a computing system comprising a computer processor coupled to a computer-readable memory unit, the memory unit comprising instructions that when executed by the computer processor implements a method comprising: dynamically generating, by the computer processor, a role/account attribute table storage from static and dynamic rule defined values; receiving, by the computer processor from a user, a role request for a first role associated with the user; calculating, by the computer processor, a set of attributes comprising a result of the role request; storing, by the computer processor within the role/account attribute table storage, the set of attributes; transmitting, by the computer processor to a target system, the set of attributes, wherein the target system evaluates the set of attributes for constraints; and receiving, by the computer processor, a result of the target system evaluating the set of attributes for constraints.

A third aspect of the invention provides a computer program product, comprising a computer readable hardware storage device storing a computer readable program code, the computer readable program code comprising an algorithm that when executed by a computer processor of a computer system implements a method, the method comprising: dynamically generating, by the computer processor, a role/account attribute table storage from static and dynamic rule defined values; receiving, by the computer processor from a user, a role request for a first role associated with the user; calculating, by the computer processor, a set of attributes comprising a result of the role request; storing, by the computer processor within the role/account attribute table storage, the set of attributes; transmitting, by the computer processor to a target system, the set of attributes, wherein the target system evaluates the set of attributes for constraints; and receiving, by the computer processor, a result of the target system evaluating the set of attributes for constraints.

The present invention advantageously provides a simple method and associated system capable of determining system limitations.

DETAILED DESCRIPTION

Figure 1:
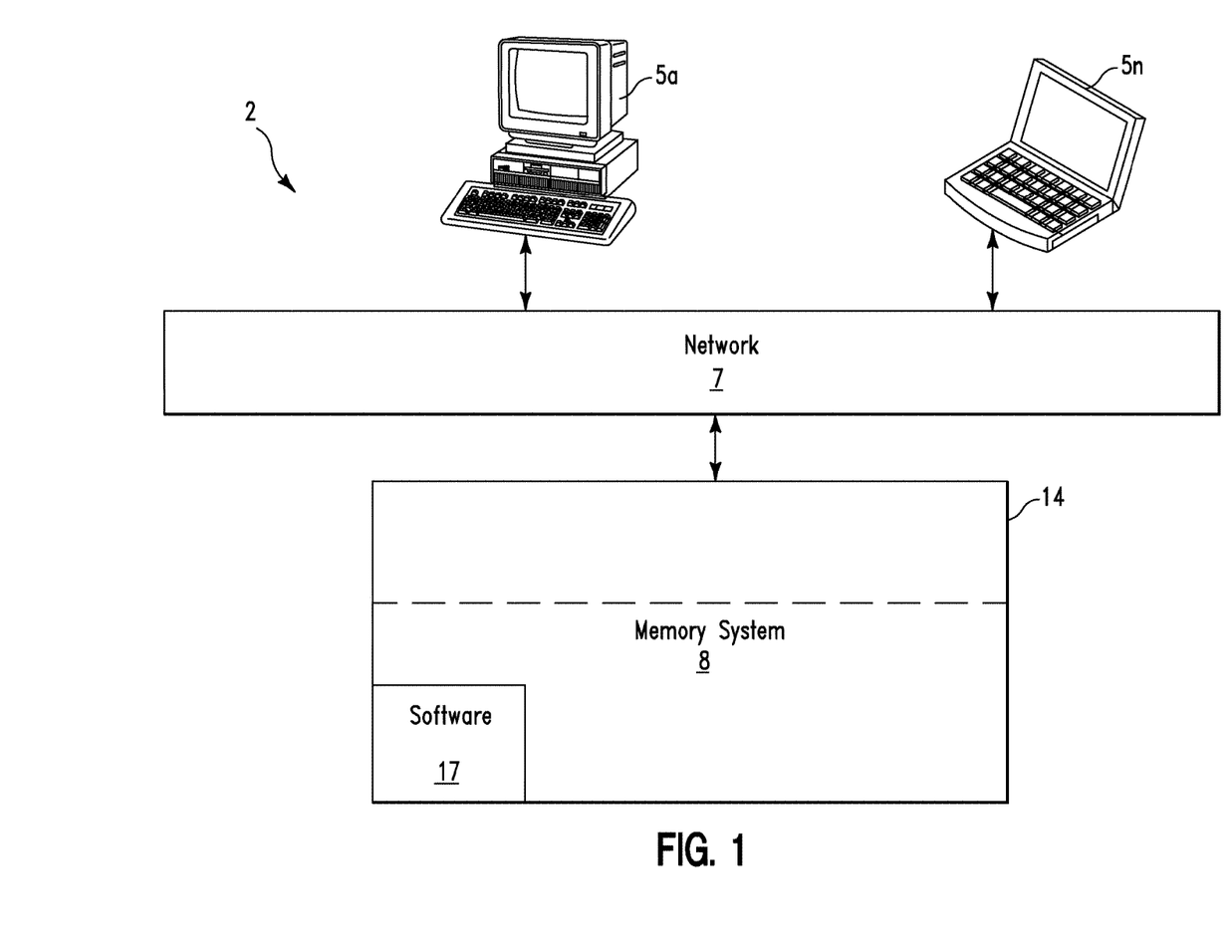
FIG. 1 illustrates an identity management system for provisioning and transforming constraints, in accordance with embodiments of the present invention.

FIG. 1 illustrates an identity management system 2 for provisioning and transforming constraints, in accordance with embodiments of the present invention. A constraint provisioning process comprises back tracking constraints from an external system (to a role based access control) identity management system 2 such that the constraints may be transformed from an account attribute value level (provided by the external system) to the role based access control (RBAC) role level associated with identity management system 2. A role comprises a job function or title defining an authority level. System 100 enables a method for handling constraints in externally provisioned systems. The constraints are only available in the externally provisioned systems or any other system external to identity management system 2. Identity management system 2 evaluates separation of duties with respect to programmatic assigned values.

Identity management system 2 of FIG. 1 includes computers 5a . . . 5n connected through a network 7 to a computing system 14. Network 7 may include any type of network including, inter alia, a local area network, (LAN), a wide area network (WAN), the Internet, a wireless network, etc. Computers 5a . . . 5n may include any type of computing system(s) including, inter alia, a computer (PC), a laptop computer, a tablet computer, a server, a Personal Digital Assistant (PDA), a smart phone, etc. Computing system 14 may include any type of computing system(s) including, inter alia, a computer (PC), a laptop computer, a tablet computer, a server, etc. Computing system 14 includes a memory system 8. Memory system 8 may include a single memory system. Alternatively, memory system 8 may include a plurality of memory systems. Memory system 8 includes software 17 comprising multiple analytical engines.

Identity management system 2 performs the following process for handling an external constraint situation:
1. Dynamically generating a table from static and dynamic (rule) defined values such that a resulting set of attribute values are linked to an originating role (i.e., an attribute value to role mapping table).
2. After generating the table, an internal/external function is called resulting in a set of conflicting values based on constraints in target system or external separation of duty (SOD) system.
3. Retrieving resulting sets and mapping the resulting sets to similar constraint sets on role level.
4. Calling an action to remedy the set of constraints. For example, via removal of roles from request, approval of exception(s), etc.
5. Evaluating SOD issues based on programmatic assigned values.

Simple role based access control (RBAC) provisioning comprises a basis for RBAC provisioning comprising a request for a role set comprising one or more roles. The role set is used as input to a provisioning process and mapped to account attributes of a provisioned system(s) together with eventual existing (un-modified) account attributes associated with the requested role and a mechanism to resolve joint policy results of an eventual overlapping of account attributes. The following Example 1 illustrates a request of a Role1 resulting in an account change where a Value1 is added to an existing Value2 of the account. The Value2 is governed by an additional provisioning account entitlement parameter.

Generally, a process for mapping from a set of roles to a set of attribute values is performed with respect to a set of methods that include set operations (e.g., mapping/joining) and programmatic functions (e.g., regular expressions and scripting in languages such as, inter alia, JavaScript).

If a target system comprises rules that define constraints between attribute values (e.g., separation of duty) where certain values are normally not allowed together and may require special authorization, the rules may not be known to an identity management provisioning process. Therefore, a constraint evaluation process may be reflected in the identity management provisioning process so that eventual conflicts may be expressed in terms of identity management provisioning role conflicts and be resolved within an identity management provisioning solution before a final result is enforced into a provisioning target system as described, infra, with respect to FIG. 2.

Figure 2:
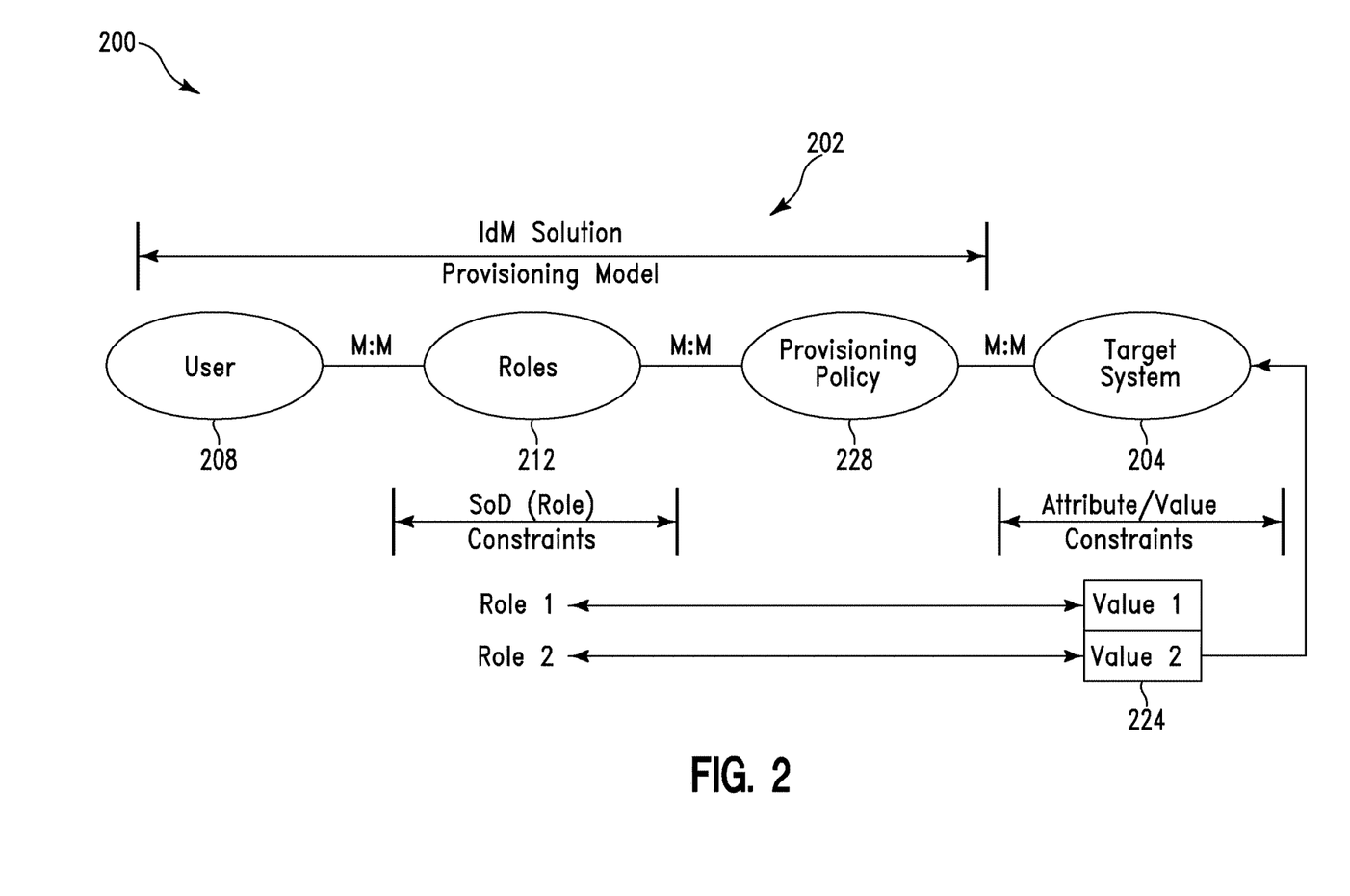
FIG. 2 illustrates a system representing an implementation example describing an identity management solution model enabled by the identity management system of FIG. 1, in accordance with embodiments of the present invention.

FIG. 2 illustrates a system 200 representing an implementation example describing an identity management (IdM) solution model 202 enabled by identity management system 2 of FIG. 1, in accordance with embodiments of the present invention. System 200 enables a user 208 to request two roles: Role1 and Role2 in an identity management solution. A target system 204 generates a constraint on resulting Value1 and Value2 and generates an approval workflow that is rejected subsequently resulting in the removal of Value2 from target system 204. During a next reconciliation the identity management solution performs a revalidation of associated roles 212 and adds the Value2 to target system 204 again. User 208, roles 212, provisioning policy 228, and target system 204 are subjected to many-to-many (M:M) relationships between each other. The implementation example of FIG. 2 illustrates constraints 224 in target system 204 being returned to the identity management solution (i.e., Value1 and Value2 not being allowed). The identity management solution may additionally flag Role1 and Role2 as having a constraint from target system 204. System 200 implements a method for flagging a role as an external violation and providing methods to accept a constraint situation or remove an inconsistent role from the request. Target system 204 is able to handle resulting attribute values from a remedied request without further actions as illustrated in the following table 1:

EXAMPLE 1

| Role | Provisioning Account Entitlement Parameter | Account Attribute Value | Existing Account Attribute Value | Account Attribute Value Join Policy | Final Account Attribute Value |
|---|---|---|---|---|---|
| Role1 | Attr1: Value1 | Attr1: Value1 | Attr1: Value2 | Join | Value1 Value2 |

The following Example 2 illustrates a request of a Role1 resulting in an account change where a Value1 is replacing an existing Value2 of the account resulting from a join policy thereby implying that an account entitlement parameter for Value1 comprises a higher priority than the Value2.

EXAMPLE 2

| Role | Provisioning Account Entitlement Parameter | Account Attribute Value | Existing Account Attribute Value | Account Attribute Value Join Policy | Final Account Attribute Value |
|---|---|---|---|---|---|
| Role1 | Attr1: Value1 | Attr1: Value1 | Attr1: Value2 | Priority | Value1 |

TABLE 1

| Role | Provisioning Account Entitlement Parameter | Account Attribute Value | Existing Account Attribute Value | Account Attribute Value Join Policy | Final Account Attribute Value |
|---|---|---|---|---|---|
| Role1 | Attr1: Value1 | Attr1: Value1 | | Join | Attr1: Value1 |
| Role2 | Attr1: Value2 | Attr1: Value2 | | Join | Attr1: Value2 |

The identity management solution may store a relationship between Roles and resulting attribute values in a table structure as illustrated in table 2:

TABLE 2

Role to Attribute Value Map

| Role1 | Attr1: Value1 |
|---|---|
| Role2 | Attr1: Value2 |

A constraint is defined as a function of attribute values. For example, an equation: SUM(Exists(Attr1:Value1),Exists(Attr1:Value2))<=1 describes a constraint to check whether Attr1:Value1 and Attr1:Value2 exists on a same result set (if they do the SUM will be 2). If the constraint function returns a false reading it is considered violated. Therefore, a call out function is applied to an external system to receive an eventual constraint back as illustrated in table 3:

TABLE 3

| Attr1: Value1 | SUM(Exists(Attr1: Value1), Exists(Attr1: Value2)) <= |
|---|---|
| Attr1: Value2 | SUM(Exists(Attr1: Value1), Exists(Attr1: Value2)) <= |

A constraining system returns a list of attribute values back to the identity management system. The list of attribute values is then mapped back to a roles and attribute values structure and the constraint is carried over into a new constraint on a role level as illustrated in table 4:

TABLE 4

| Role1 | Attr1: Value1 | SUM(Exists(Role1), Exists(Role2)) <= 1 |
|---|---|---|
| Role2 | Attr1: Value2 | SUM(Exists(Role1), Exists(Role2)) <= 1 |

Therefore, the identity management system may remedy the situation by removing one of the roles (a change should trigger repetition of the external validation process) or by approving the constraint before transmitting final values to the target system.

Figure 3:
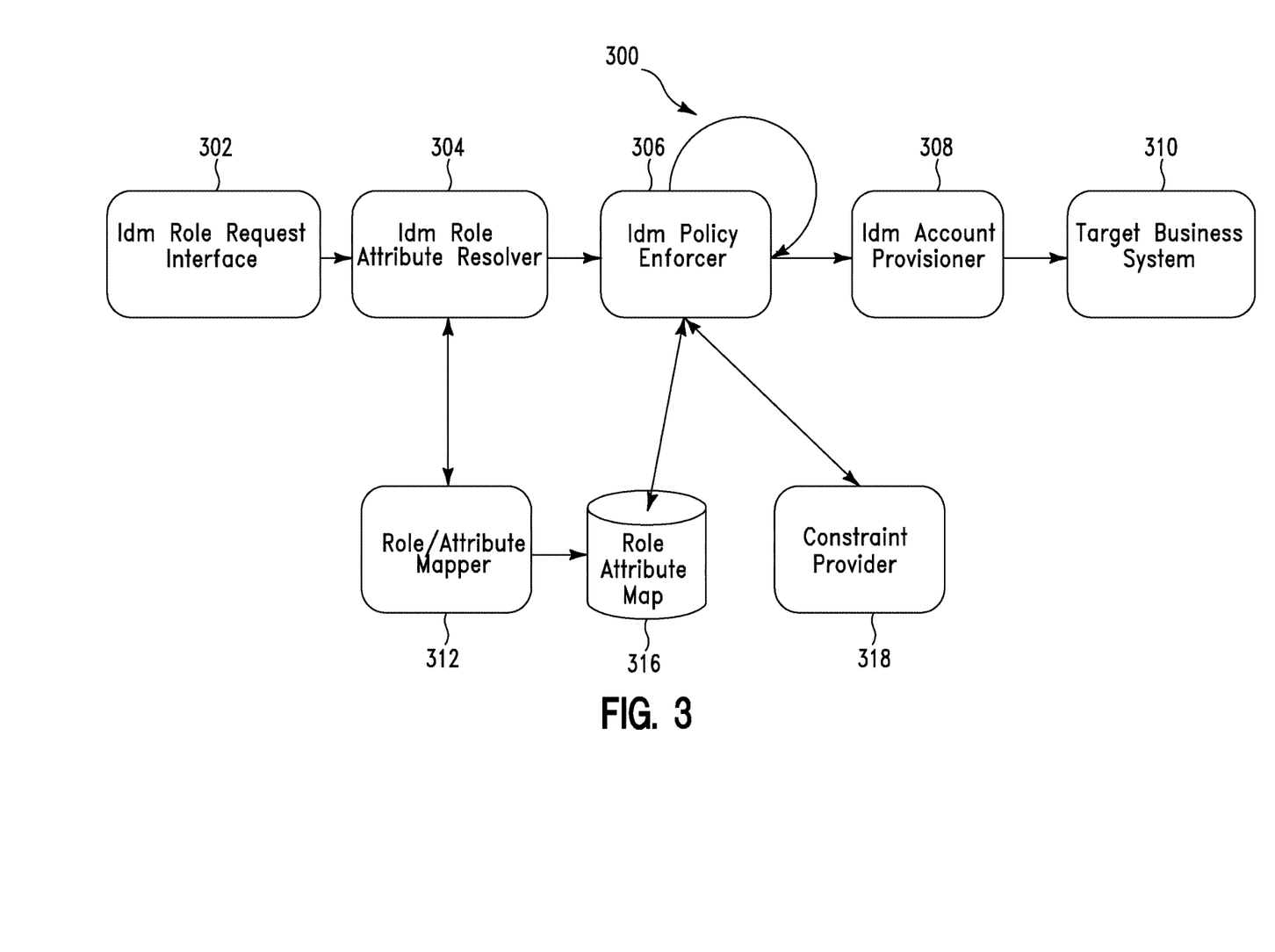
FIG. 3 illustrates a component view of a system illustrating a process for provisioning and transforming constraints, in accordance with embodiments of the present invention.

FIG. 3 illustrates a component view of a system 300 illustrating a process for provisioning and transforming constraints, in accordance with embodiments of the present invention. The process includes:

Receiving a request for a new role assignment is received (from a role request interface) by a role attribute resolver component 304 of an identity management system. The request triggers a workflow in the identity management system resulting in a resolution of resulting accounts and associated attributes and values. Resulting account attribute details and parent role details are transmitted to a role attribute mapper component 312. Role attribute mapper component 312 maintains a role attribute map data store 316 based on input from role attribute mapper component 312. Control is returned to an identity management system workflow. Control is passed to identity management system policy enforcer component 306. Identity management system policy enforcer component 306 requests a constraint compliance check from an external constraint provider component 318. A result is returned to identity management system policy enforcer component 306. If any non-compliance results remain from external constraint provider component 318, system policy enforcer component 306 reads a role attribute. In response, role attribute map data store 316 is ordered to obtain parent role(s) for non-compliant attributes. Identity management system policy enforcer component 306 remedies the non-compliances. Final account and associated attributes are forwarded (i.e., by account provisioner component 308) for provisioning to a target business system 310.

Figure 4:
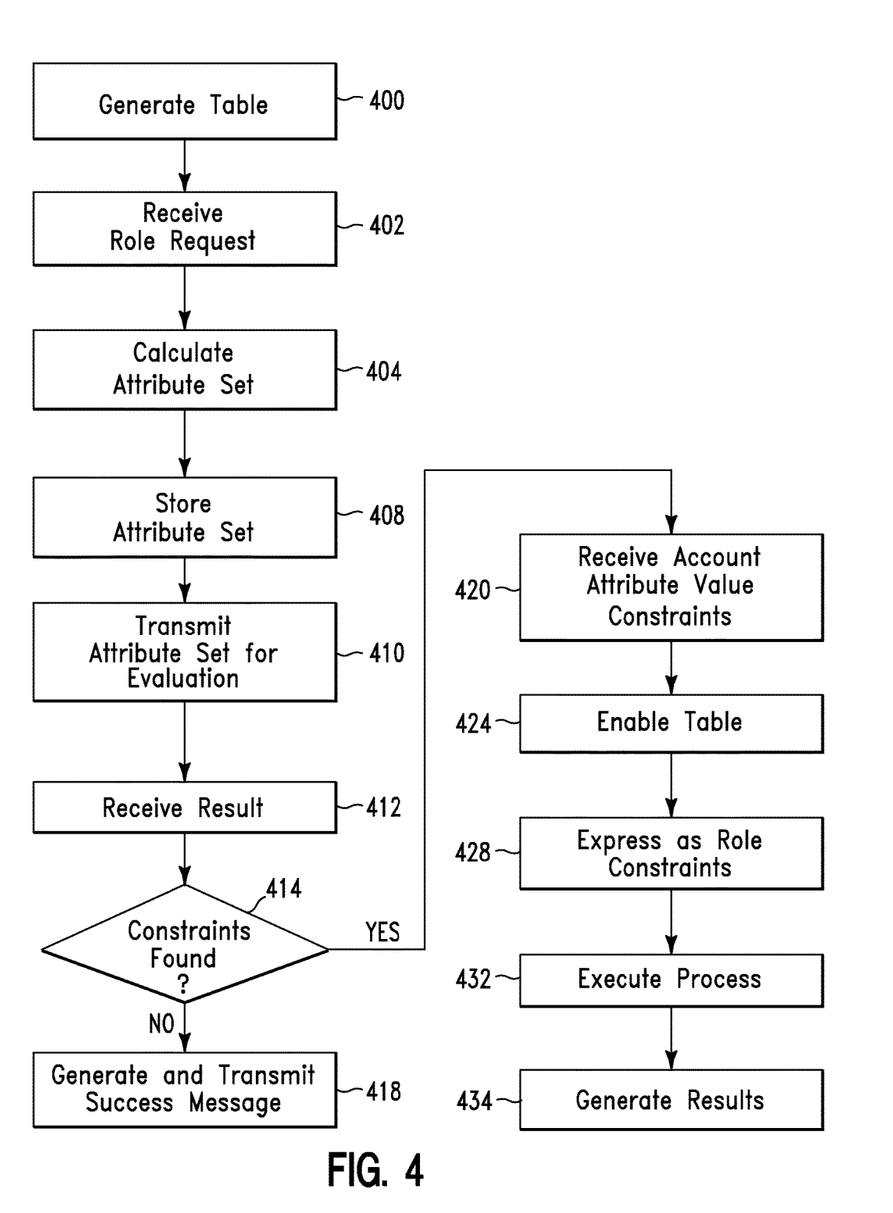
FIG. 4 illustrates an algorithm detailing a process flow enabled by the systems of FIGS. 1 and 3 for provisioning and transforming constraints, in accordance with embodiments of the present invention.

FIG. 4 illustrates an algorithm detailing a process flow enabled by system 100 of FIG. 1 or system 300 of FIG. 3 for performing a process for provisioning and transforming constraints, in accordance with embodiments of the present invention. Each of the steps in the algorithm of FIG. 4 may be enabled and executed in any order by a computer processor executing computer code. In step 400, a role/account attribute table storage is generated from static and dynamic rule defined values. In step 402, a role request for a first role associated with a user is received from the user. In step 404, a set of attributes comprising a result of the role request are calculated. In step 408, the set of attributes are stored within the role/account attribute table storage. In step 410, the set of attributes are transmitted to a target system. The target system evaluates the set of attributes for constraints. In step 412, a result of the target system evaluating the set of attributes for constraints is received. In step 414, it is determined if any constraints have been located. If in step 414 it is determined that constraints have not been located then in step 418, a success message (indicating a success status) is generated and transmitted. If in step 414 it is determined that constraints have been located the in step 420, account attribute value constraints indicating the constraints are received from the target system. In step 424, the role/account attribute table storage is enabled. In step 428, the account attribute value constraints are expressed as role constraints. In step 432, an identity management process for management of the role constraints is executed. In step 434, results of the execution are generated.

Figure 5:
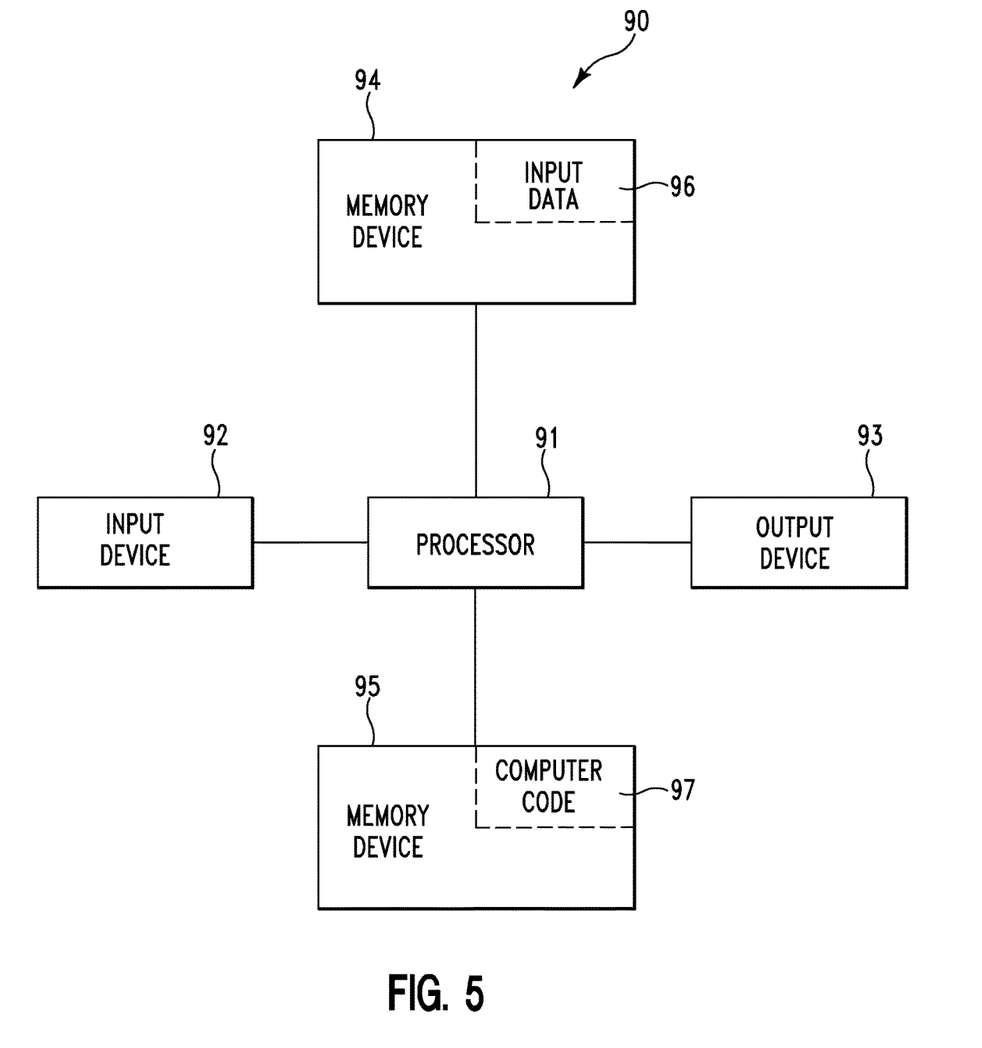
FIG. 5 illustrates a computer apparatus used by the systems of FIGS. 1 and 3 for provisioning and transforming constraints, in accordance with embodiments of the present invention.

FIG. 5 illustrates a computer apparatus 90 (e.g., computing system 14 of FIG. 1 and/or system 300 of FIG. 3) used by system 2 of FIG. 1 or system 300 of FIG. 3 for performing a process for provisioning and transforming constraints, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc.

The memory device 95 includes computer code 97. The computer code 97 includes algorithms (e.g., the algorithm of FIG. 4) for performing a process for provisioning and transforming constraints. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may include the algorithm of FIG. 4 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to perform a process for provisioning and transforming constraints. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for performing a process for provisioning and transforming constraints. In another embodiment, the invention provides a business method that performs the process steps of the invention on a subscription, advertising, and/or fee basis. That is, a service supplier, such as a Solution Integrator, could offer to perform a process for provisioning and transforming constraints. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A memory storage compliance method comprising:
   dynamically generating, by a computer processor of an identity management system, a role/account attribute table for memory device storage from static and dynamic rule defined values such that a resulting set of attribute values are linked to an originating role, wherein said role/account attribute table comprises:
      a plurality of rows, wherein each row of said plurality of rows comprises a an originating role associated with computer access control; and
      a plurality of columns intersecting said plurality of rows to define said attribute values;
   calling, by said computer processor, an internal and external programmatic function resulting in execution of a set of conflicting values based on constraints within a target computer system comprising a resulting set of attribute values linked to said originating role of said role/account attribute table;
   mapping, by said computer processor executing said internal and external programmatic function, a set of roles to said set of attribute values for storage in said role/account attribute table, wherein said mapping is executed with respect to mapping/joining set operations and programmatic scripting computer functions;
   receiving from said set of roles, by said computer processor from a user, a role request for a first role associated with said user;
   calculating, based on said mapping by said computer processor, a set of attributes and associated parent role details comprising a result of said role request;
   storing, by said computer processor within a role attribute map data store comprising said role/account attribute table storage, said set of attributes and said associated parent role details;
   requesting, by said computer processor executing a policy enforcer component, a constraint compliance check with respect to said set of attributes executed by an external constraint provider component, wherein said external constraint provider component is external to said identity management system;
   transmitting, by said computer processor to a target system in response to said requesting, said set of attributes, wherein said target system evaluates said set of attributes for constraints;
   generating, by said computer processor based on said target system evaluating said set of attributes for constraints, a false reading for attributes of said set of attributes;
   flagging, by said computer processor based on said false reading, said first role as an external violation;
   receiving, by said computer processor based on said flagging, a result of said target system evaluating said set of attributes for constraints such that said role attribute map data store retrieves specified parent roles from said associated parent role details for non-compliant attributes of said set of attributes;
   determining, by said computer processor, based on results of said calling, said mapping, and said flagging, memory storage conflicts associated with storing said mapping/joining set operations and programmatic scripting computer functions; and
   removing, by said computer processor based on said non-compliant attributes, said first role from said role request thereby resolving said memory storage conflicts and system limitations resulting in a provisioning solution for non-compliant memory storage.

2. The method of claim 1, wherein said result indicates that said set of attributes does not comprise constraints, and wherein said method further comprises:
   receiving, by said computer processor from said target system, a message indicating a success status.

3. The method of claim 1, wherein said result indicates that said set of attributes comprises constraints, and wherein said method further comprises:
   receiving, by said computer processor from said target system, account attribute value constraints indicating said constraints;

enabling, by said computer processor, said role/account attribute table storage;

expressing, by said computer processor in response to said enabling, said account attribute value constraints as role constraints;

executing, by said computer processor, an identity management process for management of said role constraints; and generating, by said computer processor, results of said executing.

4. The method of claim 1, wherein said executing said identity management process comprises:

mapping said role constraints to a set of similar constraints of said role/account attribute table storage; and generating a remedy action associated with said role constraints.

5. The method of claim 4, wherein said remedy action comprises an action selected from the group consisting of removal of roles from said role request and approval of exceptions for said role request.

6. The method of claim 1, further comprising:

evaluating, by said computer processor, a separation of duty on programmatic assigned values for said set of attributes.

7. The method of claim 1, wherein said role/account attribute table storage comprises a role column, an entitlement parameter column, an account attribute value column, an existing account attribute value column, an account attribute value join policy column, and a final account attribute value column.

8. The method of claim 1, further comprising:

providing at least one support service for at least one of creating, integrating, hosting, maintaining, and deploying computer-readable code in the computing system, said code being executed by the computer processor to implement: said dynamically generating, said receiving said role request, said calculating, said storing, said transmitting, and said receiving said result.

9. A computing system comprising a computer processor coupled to a computer-readable memory unit, said memory unit comprising instructions that when executed by the computer processor implements a memory storage compliance method comprising:

dynamically generating, by said computer processor, a role/account attribute table for memory device storage from static and dynamic rule defined values such that a resulting set of attribute values are linked to an originating role, wherein said role/account attribute table comprises;

a plurality of rows, wherein each row of said plurality of rows comprises a an originating role associated with computer access control; and a plurality of columns intersecting said plurality of rows to define said attribute values;

calling, by said computer processor, an internal and external programmatic function resulting in execution of a set of conflicting values based on constraints within a target computer system comprising a resulting set of attribute values linked to said originating role of said role/account attribute table;

mapping, by said computer processor executing said internal and external programmatic function, a set of roles to said set of attribute values for storage in said role/account attribute table, wherein said mapping is executed with respect to mapping/joining set operations and programmatic scripting computer functions;

receiving from said set of roles, by said computer processor from a user, a role request for a first role associated with said user;

calculating, based on said mapping by said computer processor, a set of attributes and associated parent role details comprising a result of said role request;

storing, by said computer processor within a role attribute map data store comprising said role/account attribute table storage, said set of attributes and said associated parent role details;

requesting, by said computer processor executing a policy enforcer component, a constraint compliance check with respect to said set of attributes executed by an external constraint provider component, wherein said external constraint provider component is external to said identity management system;

transmitting, by said computer processor to a target system in response to said requesting, said set of attributes, wherein said target system evaluates said set of attributes for constraints;

generating, by said computer processor based on said target system evaluating said set of attributes for constraints, a false reading for attributes of said set of attributes;

flagging, by said computer processor based on said false reading, said first role as an external violation;

receiving, by said computer processor based on said flagging, a result of said target system evaluating said set of attributes for constraints such that said role attribute map data store retrieves specified parent roles from said associated parent role details for non-compliant attributes of said set of attributes;

determining, by said computer processor, based on results of said calling, said mapping, and said flagging, memory storage conflicts associated with storing said mapping/i pining set operations and programmatic scripting computer functions; and removing, by said computer processor based on said non-compliant attributes, said first role from said role request thereby resolving said memory storage conflicts and system limitations resulting in a provisioning solution for non-compliant memory storage.

10. The computing system of claim 9, wherein said result indicates that said set of attributes does not comprise constraints, and wherein said method further comprises:

receiving, by said computer processor from said target system, a message indicating a success status.

11. The computing system of claim 9, wherein said result indicates that said set of attributes comprises constraints, and wherein said method further comprises:

receiving, by said computer processor from said target system, account attribute value constraints indicating said constraints;

enabling, by said computer processor, said role/account attribute table storage;

expressing, by said computer processor in response to said enabling, said account attribute value constraints as role constraints;

executing, by said computer processor, an identity management process for management of said role constraints; and generating, by said computer processor, results of said executing.

12. The computing system of claim 9, wherein said executing said identity management process comprises:

mapping said role constraints to a set of similar constraints of said role/account attribute table storage; and generating a remedy action associated with said role constraints.

13. The computing system of claim 12, wherein said remedy action comprises an action selected from the group consisting of removal of roles from said role request and approval of exceptions for said role request.

14. The computing system of claim 9, wherein said method further comprises:
evaluating, by said computer processor, a separation of duty on programmatic assigned values for said set of attributes.

15. The computing system of claim 9, wherein said role/account attribute table storage comprises a role column, an entitlement parameter column, an account attribute value column, an existing account attribute value column, an account attribute value join policy column, and a final account attribute value column.

16. A computer program product, comprising a non-transitory computer readable hardware storage device storing a computer readable program code, said computer readable program code comprising an algorithm that when executed by a computer processor of a computer system implements a memory storage compliance method, said method comprising:
dynamically generating, by said computer processor, a role/account attribute table for memory device storage from static and dynamic rule defined values such that a resulting set of attribute values are linked to an originating role, wherein said role/account attribute table comprises:
a plurality of rows, wherein each row of said plurality of rows comprises a an originating role associated with computer access control: and
a plurality of columns intersecting said plurality of rows to define said attribute values:
calling, by said computer processor, an internal and external programmatic function resulting in execution of a set of conflicting values based on constraints within a target computer system comprising a resulting set of attribute values linked to said originating role of said role/account attribute table;
mapping, by said computer processor executing said internal and external programmatic function, a set of roles to said set of attribute values for storage in said role/account attribute table, wherein said mapping is executed with respect to mapping/joining set operations and programmatic scripting computer functions;
receiving from said set of roles, by said computer processor from a user, a role request for a first role associated with said user;
calculating, based on said mapping by said computer processor, a set of attributes and associated parent role details comprising a result of said role request;
storing, by said computer processor within a role attribute map data store comprising said role/account attribute table storage, said set of attributes and said associated parent role details;
requesting, by said computer processor executing a policy enforcer component, a constraint compliance check with respect to said set of attributes executed by an external constraint provider component, wherein said external constraint provider component is external to said identity management system;
transmitting, by said computer processor to a target system in response to said requesting, said set of attributes, wherein said target system evaluates said set of attributes for constraints;
generating, by said computer processor based on said target system evaluating said set of attributes for constraints, a false reading for attributes of said set of attributes;
flagging, by said computer processor based on said false reading, said first role as an external violation;
receiving, by said computer processor based on said flagging, a result of said target system evaluating said set of attributes for constraints such that said role attribute map data store retrieves specified parent roles from said associated parent role details for non-compliant attributes of said set of attributes;
determining, by said computer processor, based on results of said calling, said mapping, and said flagging, memory storage conflicts associated with storing said mapping/joining set operations and programmatic scripting computer functions; and
removing, by said computer processor based on said non-compliant attributes, said first role from said role request thereby resolving said memory storage conflicts and system limitations resulting in a provisioning solution for non-compliant memory storage.

17. The computer program product of claim 16, wherein said result indicates that said set of attributes does not comprise constraints, and wherein said method further comprises:
receiving, by said computer processor from said target system, a message indicating a success status.

18. The computer program product of claim 16, wherein said result indicates that said set of attributes comprises constraints, and wherein said method further comprises:
receiving, by said computer processor from said target system, account attribute value constraints indicating said constraints;
enabling, by said computer processor, said role/account attribute table storage;
expressing, by said computer processor in response to said enabling, said account attribute value constraints as role constraints;
executing, by said computer processor, an identity management process for management of said role constraints; and
generating, by said computer processor, results of said executing.

19. The computer program product of claim 16, wherein said executing said identity management process comprises:
mapping said role constraints to a set of similar constraints of said role/account attribute table storage; and
generating a remedy action associated with said role constraints.

20. The computer program product of claim 19, wherein said remedy action comprises an action selected from the group consisting of removal of roles from said role request and approval of exceptions for said role request.

* * * * *